3,465,031
Patented Sept. 2, 1969

3,465,031
FLAME-RETARDING AGENTS
Robert James Stephenson, Llanyravon, Cwmbran, England, assignor to Monsanto Chemicals Limited, London, England, a British company
No Drawing. Continuation-in-part of application Ser. No. 320,500, Oct. 31, 1963. This application Nov. 9, 1967, Ser. No. 682,738
Int. Cl. C07c 69/72, 43/12; C09d 5/18
U.S. Cl. 260—484                                  4 Claims

ABSTRACT OF THE DISCLOSURE

Disclosed herein are novel compositions of matter having flame-retarding properties and corresponding to one of the following general structural formulae:

(a)
$$R-O-\overset{O}{\underset{}{C}}-(-CH_2-)_x-(-\overset{OH}{\underset{|}{CH}}-)_n-(-CH_2-)_{x_1}-\overset{O}{\underset{}{C}}-O-R_1$$

wherein $n$, $x$ and $x_1$ are integers selected in accordance with the following table:

| $n$ | $x$ | $x_1$ |
|---|---|---|
| 1 | 0–2 | 0–2 |
| 2 | 1, 2 | 0–2 |
| 2 | 0 | 1, 2 |
| 3 | 0–2 | 0–2 |
| 4 | 0–2 | 0–2 |

R is a bromoalkyl of from 1 to 4 carbon atoms and at least two bromines and $R_1$ is selected from the class consisting of hydrogen and R;

(b)
$$R_2-O-\overset{O}{\underset{}{C}}-\overset{OH}{\underset{|}{C}}-\overset{O}{\underset{}{C}}-O-R_3$$
$$R_3-O \quad\quad O$$

wherein $R_2$ is a bromoalkyl of from 1 to 4 carbon atoms and at least two bromines, and $R_3$ is selected from the class consisting of hydrogen and $R_2$; and (c)
$$R_4-O-CH_2-(CH_2)_{x_2}-(\overset{OH}{\underset{|}{CH}})_m-(CH_2)_{x_3}-CH_2-O-R_5$$

wherein $R_4$ is a bromoalkyl of from 1 to 4 carbon atoms and at least two bromines, $R_5$ is selected from the class consisting of hydrogen and $R_4$, $x_2$ and $x_3$ are, independently, from 0 to 2, and $m$ is an integer of from 0 to 4 provided it is at least 1 when $R_5$ is other than hydrogen.

CROSS-REFERENCES TO RELATED APPLICATIONS

This is a continuation-in-part of my copending application Ser. No. 320,500, filed Oct. 31, 1963, now U.S. Patent No. 3,401,127.

BACKGROUND OF THE INVENTION

This invention relates to flame-retardant materials, and particularly to flame-retardant synthetic resin compositions, as well as to certain new compounds that have been found to have flame-retardant properties.

Many synthetic resins, especially hydrocarbon resins such as polyethylene or polystyrene, have a tendency to burn in air and this is particularly noticeable when the resins are used in an expanded form such as for example foamed polystyrene. It has been proposed to reduce this tendency by adding a flame-retarding agent, for example certain compounds containing a halogen, to the resin in order to impart to it flame-retardant properties. This proposal has not been entirely successful, however, as it has been found that many compounds that would otherwise be good flame-retarding agents have a deleterious effect on the mechanical properties of the resin. It has for example been found difficult to produce a satisfactory flame-retardant foamed polystyrene containing a bromine-containing flame-retarding agent, because the mechanical properties of the polystyrene can be so adversely affected that there is a tendency for the foamed polystyrene to be distorted or for it to collapse.

It is an object of this invention to provide novel flame-retardant synthetic resin compositions.

Another object is the provision of novel flame-retardant styrene polymer compositions, and particularly of foamable and foamed styrene polymer compositions.

A further object is the provision, within the broader scope of the useful, flame-retarding agents, of a novel class of flame-retarding agents.

DESCRIPTION OF THE PREFERRED EMBODIMENTS

The above and other objects are attained through the provision of flame-retardant synthetic resin compositions comprised of a synthetic resin and bromine and hydroxylic group containing esters and ethers as hereinafter described; including as a preferred embodiment, a novel class of flame-retarding agents corresponding to one of the following general structural formulae:

(a)
$$R-O-\overset{O}{\underset{}{C}}-(-CH_2-)_x-\left(-\overset{OH}{\underset{|}{CH}}-\right)_n-(-CH_2-)_{x_2}-\overset{O}{\underset{}{C}}-O-R_1$$

where $n$, $x$ and $x_1$ are integers selected in accordance with the following table:

| $n$ | $x$ | $x_1$ |
|---|---|---|
| 1 | 0–2 | 0–2 |
| 2 | 1, 2 | 0–2 |
| 2 | 0 | 1, 2 |
| 3 | 0–2 | 0–2 |
| 4 | 0–2 | 0–2 |

R is a bromoalkyl of from 1 to 4 carbon atoms and at least two bromines and $R_1$ is selected from the class consisting of hydrogen and R;

(b)
$$R_2-O-\overset{O}{\underset{}{C}}-\overset{OH}{\underset{|}{C}}-\overset{O}{\underset{}{C}}-O-R_3$$
$$R_3-O \quad\quad O$$

wherein $R_2$ is a bromoalkyl of from 1 to 4 carbon atoms and at least two bromines, and $R_3$ is selected from the class consisting of hydrogen and $R_2$; and (c)
$$R_4-O-CH_2-(CH_2)_{x_2}-(\overset{OH}{\underset{|}{CH}})_m-(CH_2)_{x_3}-CH_2-O-R_5$$

wherein $R_4$ is a bromoalkyl of from 1 to 4 carbon atoms and at least two bromines, $R_5$ is selected from the class consisting of hydrogen and $R_4$, $x_2$ and $x_3$ are, independently, from 0 to 2, and $m$ is an integer of from 0 to 4 provided it is at least 1 when $R_5$ is other than hydrogen.

The following examples are presented in illustration of this invention and are not intended as limitations thereof.

Example I

This example describes the production of the compound bis(2,3-dibromopropyl)malate by the bromination of diallyl malate.

63 grams of bromine are added slowly over a period of 2 hours to a stirred solution of 42 grams of diallyl malate in 25 grams of methanol, and the solvent is distilled off under reduced pressure (ca. 20 millimeters of mercury), the maximum distillate temperature being about 60° C. The residue consists of about 102 grams of bis(2,3-dibromopropyl)malate.

Example II

This example describes the production of the compound sorbitol 1,6-bis(2',3'-dibromopropyl)ether by the bromination of sorbitol 1,6-diallyl ether.

67 grams of bromine are added slowly to a stirred solution of 52 grams of sorbitol 1,6-diallyl ether in 20 grams of methanol as in Example I. On removal of the solvent in the same way as in Example I, there are obtained about 120 grams of sorbitol 1,6-bis(2',3'-dibromopropyl) ether.

Example III

This example describes the production of the compound glycerol 1,3-bis(2',3'-dibromopropyl)ether by the bromination of the 1,3-diallyl ether of glycerol.

160 grams of bromine are added slowly to a stirred solution of 1,3-diallyl ether of glycerol in 40 grams of methanol, the reaction temperature being maintained at 20–22° C. After a total reaction time of 1.5 hours, traces of unreacted bromine and by-product hydrogen bromide are neutralized by treatment with ammonium hydroxide solution (specific gravity 0.880) and the methanol is removed by distillation at ca. 20 millimeters of mercury pressure. Some solid ammonium bromide is filtered off from the mixture remaining in the flask, yielding about 195 grams of the required product in the form of a yellow viscous oil.

Example IV

This example describes flame-retardant foamable and foamed polystyrene materials prepared using the bis (2,3-dibromopropyl)malate prepared in Example I.

100 grams of foamable polystyrene beads containing about 6% by weight of a pentane blowing agent are coated evenly with 5 grams of bis(2,3-dibromopropyl) malate by tumbling in a drum.

The resulting beads are foamed by exposing them for 4 minutes to steam at a pressure of 9 pounds per square inch gauge, and the foamed beads are then used to mold a foamed polystyrene block having a density of about 1 pound per cubic foot by placing the beads in a mold and injecting steam through small holes in the mold walls. The resulting block of foamed polystyrene is pure white and is found to have excellent mechanical properties and to be free from distortion. The foamed polystyrene is flame retardant, in that although it burns when ignited it ceases to do so when the source of ignition is removed.

Example V

This example describes flame-retardant foamed and foamed polystyrene materials prepared using the sorbitol 1,6-bis(2',2'-dibromopropyl)ether prepared in Example II.

Example IV is repeated substituting 5 grams of sorbitol 1,6-bis(2',3'-dibromopropyl)ether for the bis(2,3-dibromopropyl)malate employed therein. The resulting block of foamed polystyrene is pure white and is found to have excellent mechanical properties and to be free from distortion. The foamed polystyrene is flame retardant, in that although it burns when ignited it ceases to do so when the source of ignition is removed.

Example VI

This example describes flame-retardant foamable and foamed polystyrene materials prepared using the glycerol 1,3-bis(2',3'-dibromopropyl)ether prepared in Example III.

Example IV is repeated substituting 5 grams of glycerol 1,3-bis(2',3'-dibromopropyl)ether for the bis(2,3-dibromopropyl)malate employed therein. The resulting block of foamed polystyrene is pure white and is found to have excellent mechanical properties and to be free from distortion. The foamed polystyrene is flame retardant, in that although it burns when ignited it ceases to do so when the source of ignition is removed.

Example VII

This example describes flame-retardant foamable and foamed polystyrene materials prepared using tri(2,3-dibromopropyl)citrate.

Example IV is repeated substituting 5 grams of tri (2,3-dibromopropyl)citrate for the bis(2,3-dibromopropyl)malate employed therein. The resulting block of foamed polystyrene is pure white and is found to have excellent mechanical properties and to be free from distortion. The foamed polystyrene is flame retardant, in that although it burns when ignited it ceases to do so when the source of ignition is removed.

Example VIII

This example is presented for comparative purposes to describe the mechanical deficiencies of foamable and foamed polystyrene materials prepared using bis(2,3-dibromopropyl)fumarate; a flame-retarding compound analogous to those of this invention but without hydroxylic groups.

Example IV is repeated substituting 5 grams of bis (2,3-dibromopropyl)fumarate for the bis(2,3-dibromopropyl)malate employed therein. The foamable beads are observed to become badly creased and then collapse upon foaming. A satisfactory foamed block is not obtained.

The synthetic resin can be any synthetic resin that can advantageously be given a degree of flame retardancy, but is usually a polymer or copolymer of an ethylenically unsaturated monomer, especially a hydrocarbon monomer, for example, ethylene, propylene, butylene or a styrene such as for instance styrene itself or alpha-methylstyrene. Other suitable monomers are acrylates, such as methyl methacrylate, and vinyl esters, such as vinyl acetate. Other resins that can be used include copolymers of any of the above monomers, for instance with acrylonitrile, butadiene or isoprene, as well as mixtures of two or more of the polymers or copolymers. The process is particularly applicable to polystyrene resins, including polystyrene itself or a toughened polystyrene of the kind that incorporates a minor proportion of a natural or synthetic rubber. The synthetic resin can be one containing a blowing agent, for example, a chemical blowing agent or a volatile liquid, and the composition containing the flame-retarding agent can then be used to make a flame-retardant grade of foamed resin. Foamable polystyrene containing a pentane or other volatile hydrocarbon blowing agent can be treated with success.

In the flame-retarding agents of this invention the bromine is substituted in an aliphatic radical that is part of the ester or ether. Preferably, the aliphatic radical is an alkyl radical. Where it is an ester the flame-retarding agent can then, for example, be a bromoalkyl ester of an acid containing a hydroxylic group. More than one bromine atom must be present and more than one hydroxylic group may be present. A bromoalkyl group preferably contains up to four carbon atoms, such as an ethyl, propyl, or butyl group, although the group can be a higher one if desired.

The hydroxylic group can be either a hydroxyl group as in an alcohol or a phenol, or a hydroxyl group present in a carboxyl or sulphonic radical or in an organic phosphonic radical. A hydroxyl group capable of being converted to a salt can be in that form; for example, the hydroxyl group present in a carboxyl radical can be in salt form, for instance as an alkali metal or ammonium salt. However, in the preferred flame-retarding agents the hydroxylic group is an alcoholic hydroxyl group; more than one such group can be present if desired.

Bromoaliphatic esters are, as has been stated, the esters of appropriate acids, including monocarboxylic acids such as for instance glycollic, lactic, glyceric, beta-hydroxypropionic and beta-hydroxybutyric acids, and dihydric and polycarboxylic acids such as malic and citric acids. A specific example of such an ester is bis(2,3-dibromopropyl)malate. Other hydroxyl-containing acids are the dibasic and polybasic acids, organic or inorganic, that have been partially esterified with a dihydric or polyhydric alcohol so that a hydroxyl group is present. Examples of such hydroxyl-containing acids are the monoglyceryl and mono(ethylene glycol)esters of the dicarboxylic and polycarboxylic acids mentioned above and of phosphorus acids such as phosphoric acids, for instance monoglyceryl phosphate. Mono(bromoalkyl)esters of dicarboxylic and polycarboxylic acids which contain a hydroxyl group in the form of a free carboxyl group are also useful, and examples of these include the appropriate monoesters of oxalic, malonic, succinic, maleic, fumaric and tricarballylic acids.

Halo-aliphatic ethers that are useful include a bis(halo-aliphatic)ether that contains a hydroxyl group, and a dihydric or polyhydric alcohol partially etherified by means of a halo-aliphatic group. Alcohols that can be partially etherified in this manner are for example ethyleneglycol, propyleneglycol, glycerol, erythritol, pentaerythritol and sorbitol. Excellent results have for instance been obtained with glycerol 1,3-bis(2',3'-dibromopropyl) ether and with sorbitol 1,6-bis(2',3'-dibromopropyl)ether.

Other compounds which can be used with equivalent results include the dibromomethyl, tribromomethyl, 1,2-dibromoethyl, 2,2-dibromoethyl, 2,3-dibromopropyl, 3,4-dibromobutyl, 2,3,4-tribromobutyl, etc., esters of hydroxyl-containing acids such as 1,1-dicarboxylic-1-hydroxymethane malic acid, 1,3-dicarboxylic-1,2,3-trihydroxypropane, 1,4-dicarboxylic-1,2,3,4-tetrahydroxy-butane, etc.; citric acid; and ethers of hydroxy containing alcohols such as ethylene glycol, glycerol, 1,2,3,4-tetrahydroxybutane, 1,2,3,4,5-pentahydroxypentane, sorbitol, etc. Specific examples include bis(2,3-dibromopropyl)malate, bis[1,3 - (2',3' - dibromopropyl)formate] - 1,2,3 - trihydroxypropane, mono-2,3-dibromopropyl citrate, ethylene glycol mono-2,3-dibromopropyl ether, etc.

These novel compounds are prepared by brominating or hydrobrominating the corresponding ethylenically unsaturated carboxyl containing ester or ether. Useful starting materials are hydroxyl-containing allyl esters and ethers which when brominated give rise to the preferred dibromopropyl compounds of the invention.

In general in the process the starting-material is a hydroxylic-containing ester or ether having the ethylenic unsaturation that on bromination will give the desired product.

Returning to the broader class of flame-retarding agents useful in the practice of this invention; in general the flame-retarding agent is of course such that it is substantially involatile at the temperatures at which the chosen synthetic resin is processed. In many instances this means that the agent has a boiling point of at least 200° C., and preferably at least 250° C.

The flame-retarding agent can be added to the synthetic resin in any convenient way, for example by mixing in a mill or an extruder, but a method which often presents practical advantages is to coat particles of the resin with a thin surface layer that comprises the flame-retarding agent.

Particles of resin that can be used are for example those that result from extruding the resin into a strand that is then chopped up, or those resulting directly from a suspension polymerisation process. Foamable polystyrene beads can be treated effectively. The particles of resin can for example be coated by "tumbling" them in a drum with an appropriate quantity of flame-retardant agent and if desired an adhesive such as an oil or a wax. In other instances the resin particles can be treated with an aqueous dispersion of the flame-retarding agent so that a surface coating is applied, for instance by coagulating the dispersion.

The amount of flame-retarding agent employed depends on several factors, including the identity of the halogen it contains and the degree of flame-retardency that it is desired to impart to the synthetic resin, but in general it is preferable to employ sufficient of the agent for the resin material to contain on average between 0.5 and 5%, especially 1 to 3%, such as about 2%, by weight of bromine, or between 2 and 20%, especially between 5 and 15%, by weight of chlorine, based on the weight of the resin.

The flame-retardant compositions of this invention may be extruded or molded into many useful forms and articles. Conventional additives such as pigments, stabilizers, fillers, lubricants, etc., may be employed.

It is obvious that many variations may be made in the compositions and process herein set forth without departing from the spirit and scope of this invention.

What is claimed is:

1. As novel compositions of matter, compounds corresponding to a general formula selected from the class consisting of:

(a) 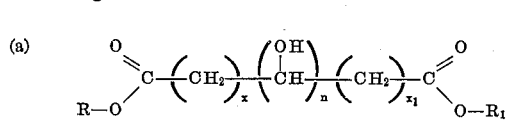

wherein $n$, $x$ and $x_1$ are integers selected in accordance with the following table:

| $n$ | $x$ | $x_1$ |
| --- | --- | --- |
| 1 | 0–2 | 0–2 |
| 2 | 1, 2 | 0–2 |
| 2 | 0 | 1, 2 |
| 3 | 0–2 | 0–2 |
| 4 | 0–2 | 0–2 |

R is a bromoalkyl of from 1 to 4 carbon atoms and at least two bromines and $R_1$ is selected from the class consisting of hydrogen and R;

(b) 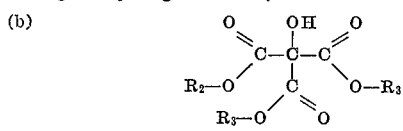

wherein $R_2$ is a bromoalkyl of from 1 to 4 carbon atoms and at least two bromines, and $R_3$ is selected from the group consisting of hydrogen and $R_2$; and

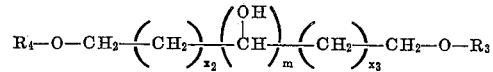

wherein $R_4$ is a bromoalkyl of from 1 to 4 carbon atoms and at least two bromines, $R_5$ is selected from the class consisting of hydrogen and $R_4$, $x_2$ and $x_3$ are, independently, from 0 to 2 and $m$ is an integer of from 0 to 4 provided it is at least 1 when $R_5$ is other than hydrogen.
2. Bis(2,3-dibromopropyl)malate.
3. Sorbitol 1,6-bis(2',3'-dibromopropyl)ether.
4. Glycerol 1,3-bis(2',3'-dibromopropyl)ether.

References Cited

UNITED STATES PATENTS

| 3,001,954 | 9/1961 | Buchholz et al. | 260—2.5 |
| 3,009,888 | 11/1961 | Mueller-Tamm et al. | 260—615 XR |
| 3,151,183 | 9/1964 | Bill | 260—869 |
| 3,236,659 | 2/1966 | Wygant et al. | 106—15 |

FOREIGN PATENTS

| 895,966 | 5/1962 | Great Britain. |
| 927,281 | 5/1963 | Great Britain. |
| 997,255 | 7/1965 | Great Britain. |

LORRAINE A. WEINBERGER, Primary Examiner

ALBERT P. HALLUIN, Assistant Examiner

U.S. Cl. X.R.

106—15; 260—2.5, 45.85, 615

UNITED STATES PATENT OFFICE
CERTIFICATE OF CORRECTION

Patent No. 3,465,031  Dated September 2, 1969

Inventor(s) Robert J. Stephenson

It is certified that error appears in the above-identified patent and that said Letters Patent are hereby corrected as shown below:

Column 2, lines 35 to 40, the structural formula (a) should read:

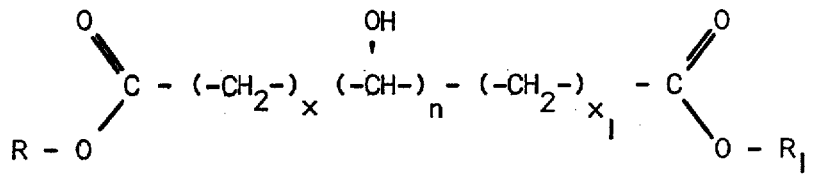

Column 6, claim 1, structural formula (c) should read:

(c)

$$R_4 - O - CH_2 -(CH_2)_{x_2} -(CH)_m -(CH_2)_{x_3} - CH_2 - O - R_5$$

with OH on the CH group.

SIGNED AND SEALED

DEC 23 1969

(SEAL)
Attest:

Edward M. Fletcher, Jr.
Attesting Officer

WILLIAM E. SCHUYLER, JR.
Commissioner of Patents